United States Patent [19]

Henderson

[11] 4,101,869

[45] Jul. 25, 1978

[54] VEHICLE WARNING DEVICES

[75] Inventor: Henning M. Henderson, 21 Marina Vista, Corner Olympia Ave. and 8th St., Parkmore, Sandton, Transvaal Province, South Africa

[73] Assignee: Alert-O-Drive (Pty) Ltd., South Africa

[21] Appl. No.: 691,990

[22] Filed: Jun. 2, 1976

[30] Foreign Application Priority Data

Jun. 4, 1975 [ZA] South Africa ............ 75/3614

[51] Int. Cl.² .............. B60Q 9/00; G06F 13/00
[52] U.S. Cl. ............................ 340/52 R; 73/654; 73/489; 235/92 AE; 340/669
[58] Field of Search ............ 340/52 R, 62, 52 F, 340/52 H, 261, 262, 377, 409; 235/92 AE, 92 TF, 92 SA, 92 PE, 92 ET, 150.21, 150.25; 324/125; 73/71.2, 489

[56] References Cited

U.S. PATENT DOCUMENTS

| | | | |
|---|---|---|---|
| 2,034,649 | 3/1936 | Brown | 235/92 AE |
| 2,288,683 | 7/1942 | Clancy | 35/11 |
| 2,307,441 | 1/1943 | Wyman | 200/84 |
| 2,574,361 | 11/1951 | Vincent | 235/92 AE |
| 2,629,030 | 2/1953 | Taylor et al. | 235/92 AE |
| 2,782,276 | 2/1957 | Woods | 200/61.47 |
| 2,816,188 | 12/1957 | Stout | 200/61.45 |
| 2,867,382 | 1/1959 | Weaver | 235/92 AE |
| 2,879,053 | 3/1959 | Weaver | 235/92 AE |
| 2,890,443 | 6/1959 | Folberth | 340/262 |
| 2,898,416 | 8/1959 | Clurman | 200/61.45 |
| 3,030,477 | 4/1962 | Hensley | 200/152 |
| 3,154,168 | 10/1964 | Wilmot | 180/82 |
| 3,355,632 | 11/1967 | Wallentowitz | 317/142 |
| 3,371,171 | 2/1968 | Gregory | 200/61.45 |
| 3,431,471 | 3/1969 | Aviander | 317/142 |
| 3,440,451 | 4/1969 | Honig | 307/293 |
| 3,469,152 | 9/1969 | Bosman | 317/142 |
| 3,512,165 | 5/1970 | Mantooth | 346/7 |
| 3,538,496 | 11/1970 | Bumpous | 340/71 |
| 3,671,933 | 6/1972 | Barnes | 340/52 H |
| 3,681,613 | 8/1972 | Flieder et al. | 307/141.4 |
| 3,693,145 | 9/1972 | Mize | 340/52 R |
| 3,695,115 | 10/1972 | Eccles et al. | 73/510 |
| 3,737,732 | 6/1973 | Suemasa et al. | 317/141 S |
| 3,757,589 | 9/1973 | Brandt, Jr. | 73/502 |
| 3,760,353 | 9/1973 | Hassinger | 340/72 |
| 3,772,643 | 11/1973 | Dodd et al. | 340/52 H |
| 3,775,743 | 11/1973 | Carter | 340/32 |
| 3,778,763 | 12/1973 | Johns et al. | 340/55 |
| 3,798,594 | 3/1974 | Funk | 340/52 H |
| 3,838,319 | 9/1974 | Hammarlund et al. | 317/141 S |
| 3,885,324 | 5/1975 | Davenport et al. | 35/11 |

FOREIGN PATENT DOCUMENTS

| | | |
|---|---|---|
| 666,673 | 4/1968 | South Africa. |
| 706,146 | 9/1971 | South Africa. |

Primary Examiner—John W. Caldwell, Sr.
Assistant Examiner—Joseph E. Nowicki
Attorney, Agent, or Firm—Stevens, Davis, Miller & Mosher

[57] ABSTRACT

A safety device for use particularly with vehicles embodies a switching arrangement which is closed when excessive accelerative forces are applied thereto. Recording means are included to record "faults" sensed by the device and means are also provided for limiting the number of "faults" recorded by the device during a single prolonged closure of the switching arrangement.

30 Claims, 3 Drawing Figures

VEHICLE WARNING DEVICES

This invention relates to safety and/or warning devices for use on vehicles and in particular, but not exclusively, motor vehicles.

Such devices embody switching arrangements adapted to be closed by excessive accelerative forces applied to a vehicle and preferably one or more counters reflect the total number of closures of such switching arrangements. Devices of this nature are useful particularly to fleet owners wishing to appraise themselves of the manner in which their drivers handle a vehicle. The accellerative forces under consideration include negative accellerative forces and centrifugal accellerative forces thus recording occurrences of excessive positive or negative accelleration or cornering at excessive speeds.

A timer unit generally allows only one 'fault' to be recorded per a selected time interval which is generally of the order of three seconds. This enables a driver to correct a fault without further faults being recorded but ensures that if the fault endures for too long, another one will be recorded.

This arrangement operates effectively but does place limitations on the location of the device in the case of vehicles having cabs tip forwardly to provide access to the vehicles engine. In such a case either the device must be switched off or it must be mounted elsewhere than to the cab.

It is the object of this invention to provide a device of the above type wherein the limitations referred to are decreased at least to some extent.

In accordance with this invention there is provided a device of the general type described which embodies means for limiting the number of 'faults' recorded by the device during a single prolonged closure of a switching arrangement associated therewith.

Further features of the invention provide for the said number of faults to be limited to about three, for further means to be embodied to prevent recording of a 'fault' by an opening and reclosing of a switching arrangement in the case where the switch is opened for only a very short time period in particular less than about a half a second and for the latter to be achieved by means of a reset timer.

It will be understood that a device as above defined avoids the difficulties or inconveniences of the prior art devices. Also, if a vehicle overturns a device according to this invention will enable a vehicle owner and also the authorities to gauge the driving activities of the driver prior to such an accident. This was not possible at all with the prior art devices regardless of where they were mounted on a vehicle.

One embodiment of the invention will now be described by way of example reference being made to the accompanying drawings in which:

FIG. 3 is a circuit diagram embodying the present invention.

Figure 1:
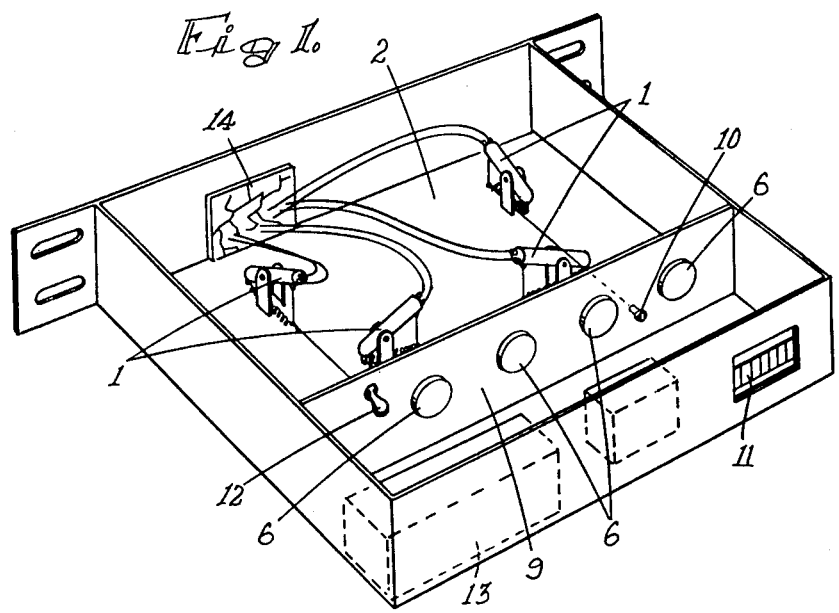
FIG. 1 is a top isometric view of a complete unit.
Figure 2:
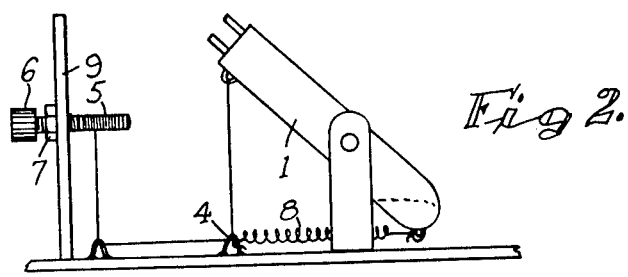
FIG. 2 is a diagrammatic elevation illustrating the sensitivity adjustment means of the unit.
Figure 2:
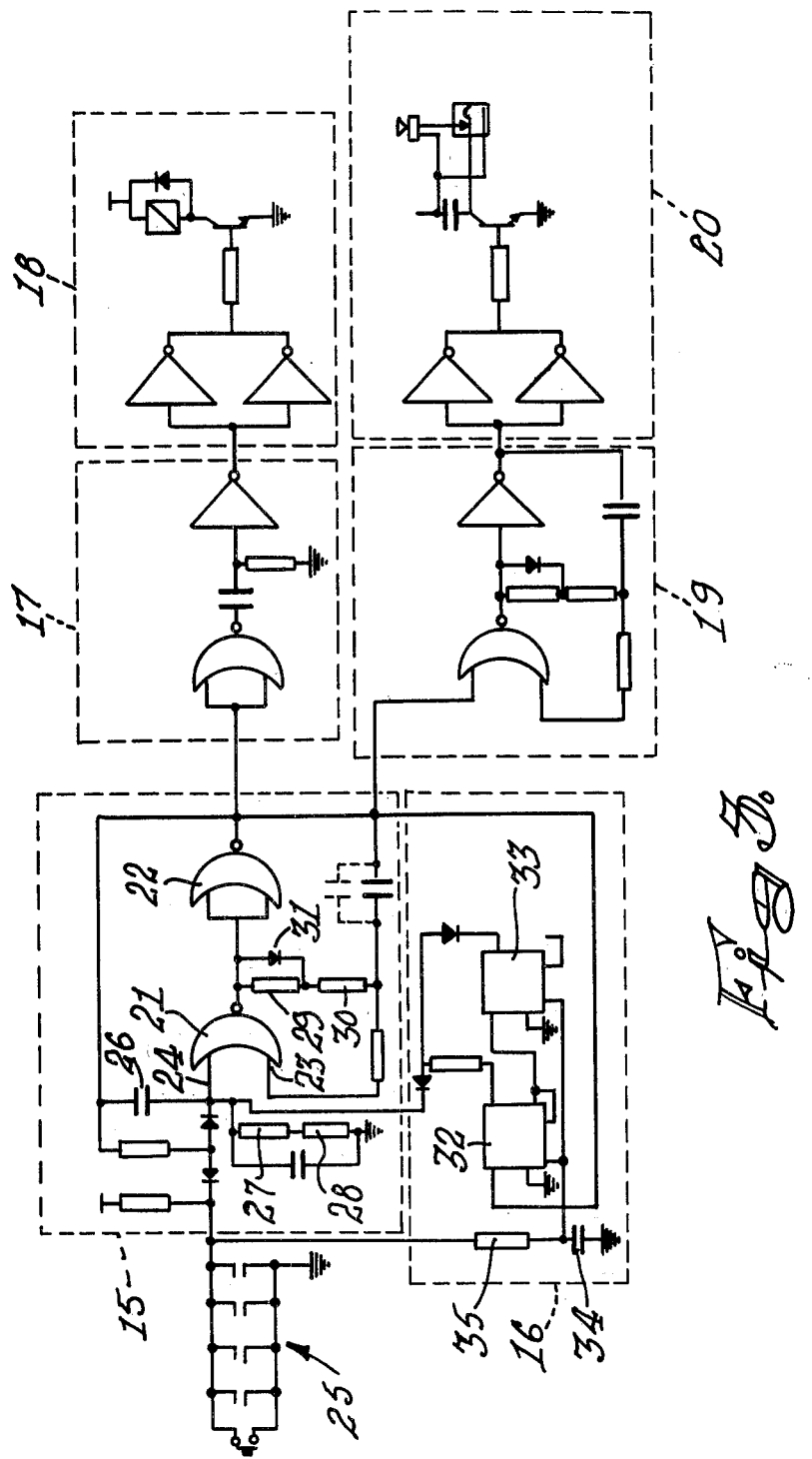

In this embodiment of the invention the device is adapted to warn a driver and count the number of warnings in respect of excessive acceleration, deceleration and cornering speeds in each direction. Thus the device is provided with four inclined glass capsules 1 two of which are located parallel in plan view to the length of the box 2 in which they are supported and are inclined upwardly in opposite directions in the vertical plane. The other two capsules are located at right angles to the first mentioned two in plan view and also are inclined upwardly in opposite directions in the vertical plane. Thus, in use the box is located such that two capsules extend parallel to the length of the vehicle in plan view and the other two are located transversely to the vehicle length. The former two are for acceleration and deceleration and the latter two are for the two cornering directions.

Each capsule contains a suitable amount of fluent conducting material which is preferably mercury and has a pair of contacts at its upper end which can be closed by mercury should it be forced sufficiently far up the capsule. Also, these capsules are preferably coated with a suitable plastics material in order to render them unbreakable.

The capsules are pivotally mounted and their inclination is adjustable by means of a flexible filiament 3 attached to the top of each capsule and passing through suitable eyelets 4 and onto a rotatable spindle 5. The latter is fitted with a knurled knob 6 and locking-nut 7 to enable the filiament to be locked in the desired position. In order to hold the capsule in position the lower end of each is biased downwardly by means of a spring 8. The four knurled knobs are located in a transverse partition wall 9 in the box which will also support a test button 10 connected simply to operate the audible alarm and counter 11 described below.

A main power switch 12 is mounted on the partition wall to isolate the power supply pack which is in the form of a battery 13 from the circuit which is contained in a printed circuit board 14 within the box. All the contacts from the capsules are also connected to the printed circuit board and the remainder of the function of the circuit will be described with reference to FIG. 3.

Referring now to FIG. 3, the circuit comprises six basic sections, viz, a main control oscillator circuit 15, a continuous fault circuit 16, a pulse generating circuit 17 for a counter arrangement 18, a gated tone oscillator circuit 19, and a tone output driver stage 20 for the audible alarm.

The pulse generating circuit 17 and counter arrangements 18 will be quite clear to those skilled in the art from the circuit diagram, the circuits being arranged to minimise battery current drain. Similarly, the gated tone oscillator and tone output driver will arrange to conserve power. Preferably in this case the mark to space ratio is about 20:1 and the frequency approximately 450Hz.

Turning now to the main oscillator circuit 15 the oscillator comprises a pair of 'nor' gates 21, 22 the first of which has one input 23 normally low and the other 24 normally high. Upon closure of one of, or the switch assembly 25 the high input is allowed to start going low in accordance with the charging of a timing capacitor 26 through a pair of series resistors 27, 28. Once the capacitor is charged to a predetermined extent (preferably about 0.13 seconds after the closure of the switch 25) the second input goes low and the oscillator is activated. It will be noted from the circuit diagram that the mark to space ratio is adjusted to about 3:1 by means of a pair of series resistors 29, 30 and a diode 31 in parallel with the one resistor 29. The oscillator is arranged to lock on for a period of about four seconds so that only one fault every four seconds can be registered. Each time the oscillator locks on the counter is activated as is the audible alarm.

Thus closure of a switch for less than 0.13 seconds will not activate the oscillator which can only be activated once every 4 seconds.

In order to prevent numerous faults being recorded if a switch is closed for long periods of time (i.e. if a vehicle is over-turned, or in the case of transport vehicles the cab is tilted forwardly to provide access to the engine) the circuit 16 allows only three consecutive operations of the oscillator to be performed as a result of a switch 25 remaining closed. Each time a switch 25 opens this circuit resets itself. The circuit comprises simply two suitable flip flops 32, 33 which hold the second input 24 to the first 'nor' gate 21 high after three successive operations of the oscillator and if the closed switch has not been opened again.

Also a capacitor 34 and series resistor 35 prevent the flip flops from being reset if a switch 25 is opened for less than say one half of a second. Thus if the device is bumped or jerked during movement whilst a switch is closed the flip flops will not reset. This avoids faults being recorded as a result of workmen operating on the vehicle whilst its cab is tilted or the like.

The invention therefore provides a useful improvement to the type of device described. The improvement may be implemented in any suitable electronic manner and is not limited to the embodiment described.

What I claim as new and desire to secure by Letters Patent is:

1. In a device for detecting and recording the occurrence of excessive inertial forces acting on a vehicle, said device having force detecting means actuated when excessive forces are acting on said vehicle, indicator means responsive to said force detecting means for indicating "faults" when said detecting means is actuated, said indicator means including timing means for preventing said indicator means from indicating additional "faults" during a predetermined time interval following the indication of a "fault," the improvement comprising counting means responsive to said indicator means and said detecting means for counting "faults" and for disabling said indicator means from indicating "faults" when the number of "faults" counted during a single actuation of said detector means exceeds a predetermined number.

2. The improvement according to claim 1 further characterized in that said predetermined number is three.

3. The improvement according to claim 1 further characterized in that said counting means includes a flip-flop circuit.

4. The improvement according to claim 1 further including means to reset said counting means in response to termination of the actuation of said detecting means.

5. The improvement according to claim 4 further including second timing means for delaying actuation of said means to reset for a second predetermined time interval following termination of the actuation of said detecting means.

6. The improvement according to claim 5 further characterized in that said second timing means is a resistor-capacitor timing circuit.

7. The improvement according to claim 5 further characterized in that said second predetermined time inverval is approximately ½ second.

8. The improvement according to claim 4 further including means for controlling said reset means to prevent reset of said counting means until said termination of actuation of said detecting means persists continuously for a second predetermined time interval.

9. The improvement according to claim 8 wherein said means for controlling is a resistor capacitor timing circuit.

10. The improvement according to claim 8 wherein said second predetermined time interval is approximately ½ second.

11. A device for detecting and recording occurrences of excessive inertial forces acting on a vehicle comprising:
   detecting means actuated when excessive inertial forces are acting on a vehicle,
   indicator means responsive to said detecting means for indicating "faults" when said detecting means is actuated, and
   counting means responsive to said detecting means and said indicator means for counting "faults" and preventing said indicating means from indicating "faults" when the number of "faults" counted during a single actuation of said detecting means exceeds a predetermined number.

12. A device as in claim 11 wherein said predetermined number is three.

13. A device as in claim 11 wherein said counting means includes a flip-flop circuit.

14. A device as in claim 11 wherein said indicator means includes timing means for preventing the indication of more than one "fault" for each of a plurality of successive first predetermined time intervals during which said detector means remains actuated.

15. A device as in claim 14 wherein each of said first predetermined time intervals is approximately 3 seconds.

16. A device as in claim 11 further comprising means to reset said counting means in response to termination of the actuation of said detecting means.

17. A device as in claim 16 further comprising means for controlling said reset means to prevent reset of said counting means until said termination of actuation of said detecting means persists continuously for a second predetermined time interval.

18. A device as in claim 17 wherein said means for controlling is a resistor capacitor timing circuit.

19. A device as in claim 17 wherein said second predetermined time interval is approximately ½ second.

20. A device as in claim 14 further comprising timing means for allowing said indicator means to be responsive to said detector means to indicate a "fault" only after said detector means remains actuated for a second predetermined time interval.

21. A device as in claim 27 wherein said second predetermined time interval is approximately 0.13 seconds.

22. A device as in claim 14 further comprising means to reset said counting means in response to termination of the actuation of said detecting means.

23. A device as in claim 22 further comprising means for controlling said reset means to prevent reset of said counting means until said termination of actuation of said detecting means persists continuously for a third predetermined time interval.

24. A device as in claim 23 wherein said means for controlling is a resistor capacitor timing circuit.

25. A device as in claim 23 wherein said third predetermined time interval is approximately ½ second.

26. A device as in claim 14 wherein said indicator means includes an oscillator circuit which, when activated, oscillates for said predetermined first time interval as determined by said timing means.

27. A device as in claim 26 wherein said oscillator circuit comprises a pair of NOR gates, a first of said NOR gates serving as the input to said oscillator, one input of said first NOR gate being normally low and said oscillator rendered operative when said actuated detecting means causes a second normally high input of said first NOR gate to go low.

28. A device as in claim 27 wherein said counting means prevents said indicator means from counting "faults" by holding said second input normally high when said counter detects that said predetermined number of "faults" has been exceeded during a single actuation of said detecting means.

29. A device for detecting and recording occurrences of excessive inertial forces acting on a vehicle comprising:

detecting means actuated when excessive inertial forces are acting on a vehicle, indicator mean responsive to said detecting means for indicating "faults" when said detecting means is actuated, said indicator means including first timing means for preventing said indicating means from indicating additional "faults" during a first predetermined time interval following the indication of a "fault", second timing means for preventing said indicator means from indicating a "fault" until said detecting means remains actuated for a second predetermined time interval, first counter responsive to said indicator means to count the total number of "faults" indicated, second counter responsive to said indicator means and said detecting means for counting "faults" and for disabling said indicator means from indicating "faults" when the number of "faults" counted during a single actuation of said detector means exceeds a predetermined number, means for resetting said second counter in response to termination of said actuation of said detecting means, and means for controlling said reset means to prevent reset of said second counting means until the termination of actuation of said detecting means persists continuously for a third predetermined time interval.

30. A device as in claim 29 further comprising an alarm circuit responsive to said indicator means for providing an audible indication of a "fault".

* * * * *